FIG. I

Thomas A. Barr, Jr.
Charles M. Cason, III
INVENTORS

Nov. 18, 1969  T. A. BARR, JR., ET AL  3,478,583
PLASMA DRIVEN SHROUD WIND TUNNEL
Filed Dec. 28, 1967  4 Sheets-Sheet 3

Thomas A. Barr, Jr.
Charles M. Cason, III
INVENTORS.

BY
Harry M. Saragovitz
Edward J. Kelly
Herbert Berl
Harold W. Hilton

Nov. 18, 1969  T. A. BARR, JR., ET AL  3,478,583
PLASMA DRIVEN SHROUD WIND TUNNEL

Filed Dec. 28, 1967  4 Sheets-Sheet 4

Thomas A. Barr, Jr.
Charles M. Cason, III
INVENTORS.

BY *Harry M. Saragovitz*
*Edward J. Kelly*
*Herbert Berl*
*Harold W. Hilton*

United States Patent Office 3,478,583
Patented Nov. 18, 1969

3,478,583
PLASMA DRIVEN SHROUD WIND TUNNEL
Thomas A. Barr, Jr. and Charles M. Cason III, Huntsville, Ala., assignors to the United States of America as represented by the Secretary of the Army
Filed Dec. 28, 1967, Ser. No. 694,186
Int. Cl. G01m 9/00
U.S. Cl. 73—147                                6 Claims

ABSTRACT OF THE DISCLOSURE

A wind tunnel utilizes plasma generators for generating a gas which is as close to equilibrium high temperature free air is possible. The wind tunnel provides the desired environment for reproducing simultaneously the heating and shearing loads on components of low altitude high velocity missiles so that the interaction of the missile with the high temperatures and high shear force boundary layer may be studied. The wind tunnel includes a copper-lined plenum having a plurality of the plasma generators communicating therein. A nozzle assembly includes a convergent portion communicating into the plenum chamber and a divergent portion communicating into a shroud which encompasses the test model. The contour of the nozzle and shroud ensures that the flow field next to the body of the test model, including the boundary layer, is the same at it would be for free flight.

Dedicatory clause

The invention described herein may be manufactured, used, and licensed by or for the Government for governmental purposes without the payment to us of any royalty thereon.

Background of the invention

In the design of a laboratory test facility for high velocity flight materials research, much difficulties have been encountered in producing simultaneously all the desired thermal and flow field effects on a test object (e.g., a nose cap or the leading edge of a fin). It is necessary, for exact duplication of the flow field, that a wind tunnel have the velocity, density, and temperature of the air at the same values as experienced in real flight.

The problems encountered in such a system are plenum pressures and temperatures. The very high plenum pressures required for flight simulation are the principal deterrent to the use of wind tunnels in this type of problem.

In the present invention the test model is disposed in a shroud and placed directly in the tunnel nozzle. The air does not go through an expansion and recompression before coming in contact with the test object as in conventional wind tunnels. The plenum conditions are substantially the same as those existing at the stagnation zone, i.e., the tip of the model, and; therefore, the plenum pressure can be several orders of magnitude lower in a shroud application or configuration than it would have to be in a plenum of a wind tunnel producing the same stagnation conditions.

Summary of the invention

The present invention comprises a wind tunnel provided with a convergent-divergent nozzle having the convergent portion communicating into a copper-lined plenum and the divergent portion communicating into a shroud which encloses the test model. The plenum is copper-lined to act as a heat sink and the nozzle and shroud are contoured to provide that the flow field next to the model, including the boundary layer, would be substantially the same as it would be in free flight.

It is, therefore, an object of the present invention to provide a wind tunnel in which the heating and shearing loads on a model are simultaneously reproduced.

It is another object of the present invention to provide such a wind tunnel in which plasma generators are utilized to produce a gas therein which very closely approximates free air composition.

It is still another object of the present invention to provide such a wind tunnel in which the plenum pressure is considerably lower than conventional wind tunnel plenum pressures for producing the same stagnation conditions.

It is yet another object of the present invention to provide such a wind tunnel with means for dissipating the head in the plenum.

Other objects and many of the attendant advantages of this invention will be readily appreciated as the same becomes better understood by reference to the following description when considered in connection with the accompanying drawing.

Brief description of the drawing

As shown in FIGURE 1 the wind tunnel 10 includes a pressure vessel or plenum 12 having a nozzle assembly 14 secured thereto. The nozzle assembly includes a replaceable block 16 (FIGURE 3) having convergent and divergent portions 18 and 20. Divergent portion 20 communicates into a test chamber 22 provided with a shroud 24 enclosing a test model 26. An aspiration pump 28 is disposed adjacent the test chamber for removal of the gases and a conduit or chimney 30 extends from the test chamber for exhausting the gases to the atmosphere. The chimney is provided with a removable portion 32 for access therein.

Figure 1:
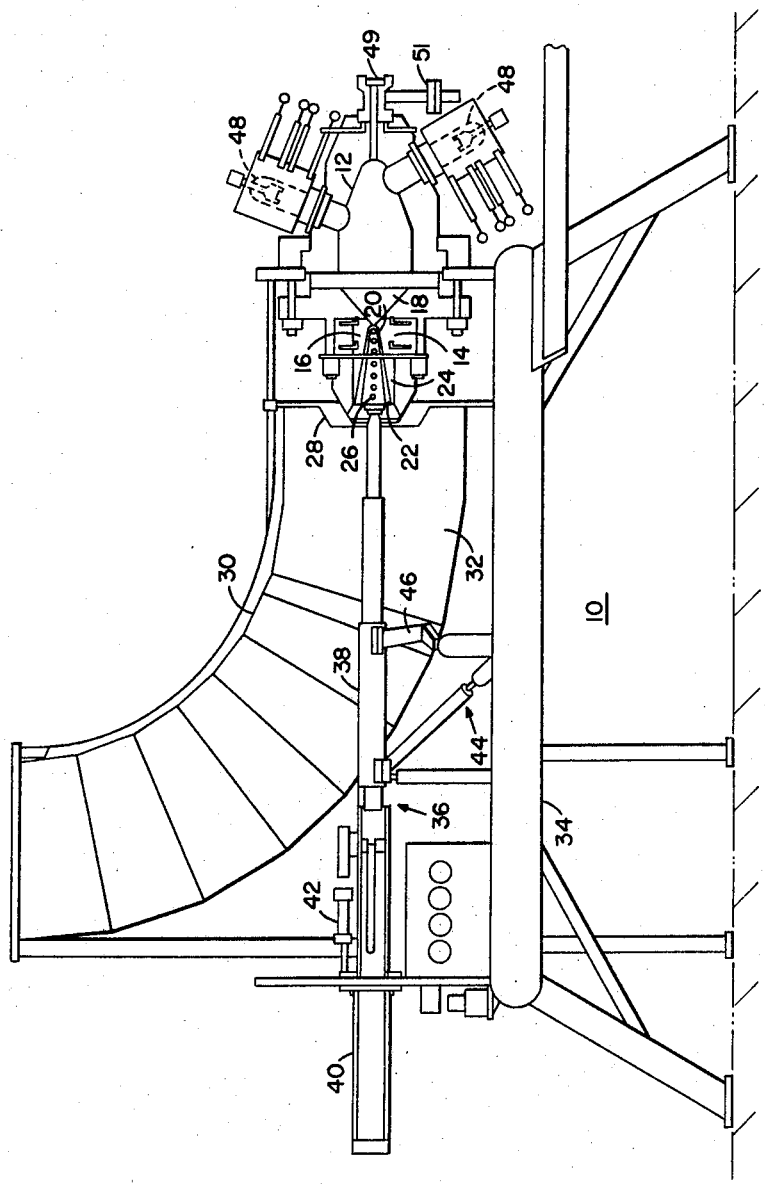
FIGURE 1 is an elevational view of the wind tunnel of the present invention.

The wind tunnel assembly is supported on a frame 34 which also serves to support a model positioning and support mechanism 36. This mechanism includes an arm or mount 38 which supports the model in the shroud, and a hydraulic actuator 40 which serves to position and retract the model. The mechanism 36 further includes a frame lock extension device 42 which is used to extend the model approximately 1 additional inch, if necessary, as a result of erosion of the surface of the model. Mechanism 36 is supported on frame 34 by mount 44 having adjustable legs 46.

Figure 2:
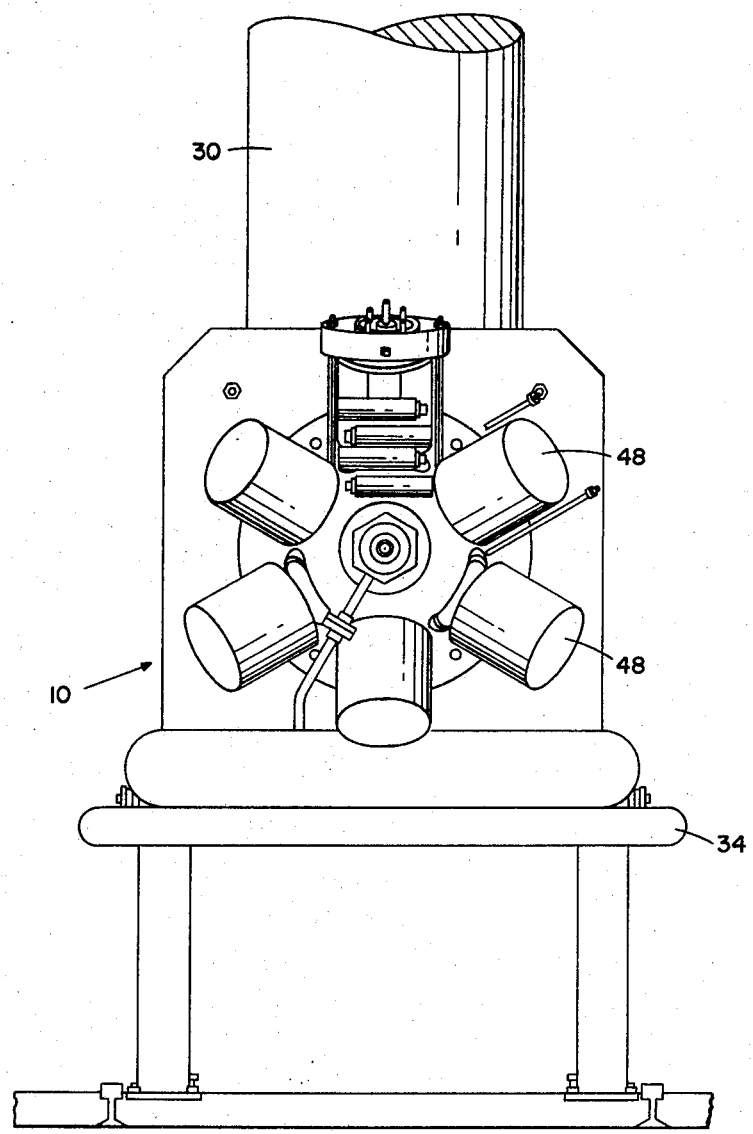
FIGURE 2 is an end elevational view of the device illustrated in FIGURE 1.

To provide the wind tunnel with a gas having a composition as close to free air as possible, a plurality of Mayo type plasma generators 48 are mounted around the plenum. As illustrated in FIGURE 2 the plasma generators are disposed in two rings of three each and are set at an angle so that no direct radiation reaches the nozzle throat.

A sight port 49 (FIGURE 1) with a strain relieved glass (or quartz) window is disposed in communication with the plenum to permit observance of the model when it is being aligned in the test chamber.

A safety feature of the wind tunnel is the provision of a pressure relief burst diaphragm 51 which connects to the plenum and the exhaust stack to vent gases therein from the plenum if the diaphragm should rupture.

Figure 3:
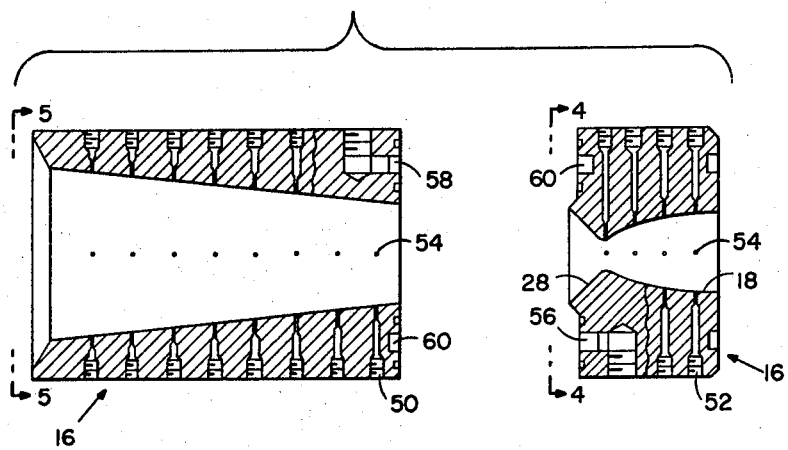
FIGURE 3 is an elevational sectional view of the nozzle and shroud, partially cut-away to illustrate the water inlet and outlet.

In operation, hydraulic actuator 40, which may be any of many hydraulic motors available in the art, is actuated for movement of arm 38 to position model 26 in test chamber 22. Alignment is sensed by feeler gages (not shown) inserted through ports 50 and 52, FIGURE 3, in the shroud 24 and nozzle throat block 16. There are four lines of ports spaced 90° apart in the shroud and nozzle blocks, alternate lines of ports are used for feeler gages. The other lines of ports 54 are used to take measurements during the wind tunnel tests as described hereinbelow. Additional alignment of the model may be accomplished by sighting through port hole 48. An additional 1 inch of forward travel at a prescribed speed is provided by mechanism 42 to partially accommodate ablation losses from the model.

Figure 4:
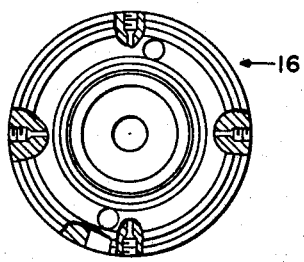
FIGURE 4 is an end view, partially in section, of the nozzle taken along line 4—4 of FIGURE 3.
Figure 5:
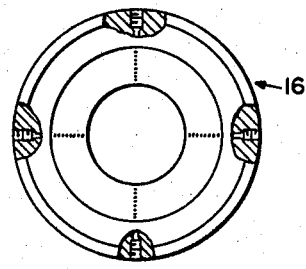
FIGURE 5 is an end view, partially in section of the shroud, taken along line 5—5 of FIGURE 3.

With the model aligned in the shroud, plasma generators 48 are energized to provide flow over the test model so that a plurality of tests may be conducted. As can be seen in FIGURE 4, the shroud is provided with a plurality of ports 54 spaced 90° from ports 50. The numeral 50 designates the ports in which feeler gages are inserted for positioning the model. These ports are plugged during the tests in the wind tunnel. The numeral 54 designates the ports in which transducers and thermocouples (not shown) are placed to provide for the pressure and temperature measurements of the model during the tests. A water inlet 56 and outlet 58 communicate with a manifold 60 to cool the system for rapid recycling thereof.

Figure 6:
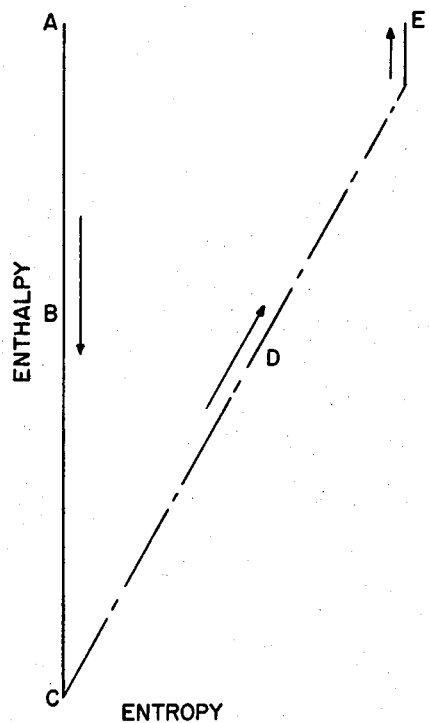
FIGURE 6 is a representation of an idealized mollier diagram for a wind tunnel.
Figure 7:
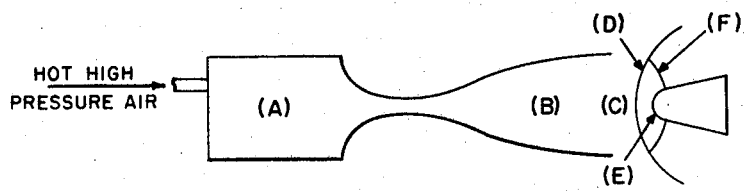
FIGURE 7 is a diagrammatic view of the idealized wind tunnel.

As shown in FIGURE 6, an idealized mollier diagram is provided for comparison with the idealized wind tunnel of FIGURE 7. The usual process for generating a gas flow is to have a pressurized plenum in which the air is at rest and in thermodynamic equilibrium with the walls of the plenum. The air then flows isentropically through an expansion nozzle to form a free stream at a predetermined velocity. At supersonic velocity, shock recovery of pressure and temperature occur on the leading edge of the model. The positions in FIGURES 6 and 7 correspond to (A) plenum conditions, (B) isentropic expansion, (C) free stream, (D) shock transition jump, (E) stagnation zone, and (F) sonic line.

Figure 8:
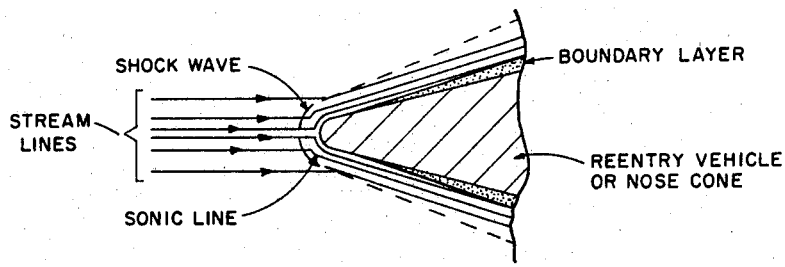
FIGURE 8 is a diagrammatic view of the shroud equivalent of the idealized wind tunnel of FIGURE 6.

FIGURE 8 shows the shroud equivalent of free flight. In the shroud approach of the present invention, air does not go through the expansion and shock recompression before coming in contact with the test object. In the shroud approach, the plenum conditions are equal to the stagnation zone conditions. This means that the plenum pressure can be several orders of magnitude lower than in a conventional wind tunnel producing the same stagnation conditions. An additional feature of the present invention is the utilization of plasma generators to provide a gas which closely approximates the composition of free air. Also, the provision of a copper-lined plenum and nozzle provides a lower wall temperature than plain steel.

We claim:

1. A wind tunnel including a test chamber adapted to receive a model therein for aerodynamic testing thereof comprising:
   (a) a plenum having a plurality of plasma generators therein for generating gases for aerodynamic testing of said model;
   (b) a convergent-divergent nozzle secured to said plenum and having a convergent portion communicating into said plenum and the divergent portion extending from the plenum;
   (c) a divergent shroud removably secured immediately adjacent said diverging portion and forming an extension thereof whereby plenum conditions and stagnation zone conditions are equalized, said shroud disposed for receiving said model therein for the testing thereof.

2. A wind tunnel as in claim 1 wherein said nozzle and plenum is provided with a copper-lined surface to act as a heat sink.

3. A wind tunnel as in claim 2 wherein said nozzle and shroud is provided with a plurality of apertures communicating with the interior thereof and adapted to receive instruments therein.

4. Apparatus as in claim 3 including cooling means for cooling said nozzle and said plenum.

5. Apparatus as in claim 4 wherein said plasma generators are disposed on said plenum in two rings having three generators disposed in each ring, said generators disposed in angular relation in said plenum whereby the gases generated by said generators will not impinge on the throat of said nozzle.

6. Apparatus as in claim 5 wherein said cooling means includes means for circulating liquid coolant through said shroud and nozzle for cooling thereof.

References Cited

UNITED STATES PATENTS

| | | | |
|---|---|---|---|
| 2,560,634 | 7/1951 | Colley. | |
| 2,920,446 | 1/1960 | Ranard. | |
| 2,972,696 | 2/1961 | Kantrowitz et al. | |
| 3,077,108 | 2/1963 | Gage et al. | 73—147 |
| 3,138,019 | 6/1964 | Fonda-Bonardi | 73—147 |
| 3,392,577 | 7/1968 | Barr et al. | 73—147 |

LOUIS R. PRINCE, Primary Examiner

JEFFREY NOLTON, Assistant Examiner